Figure 1:
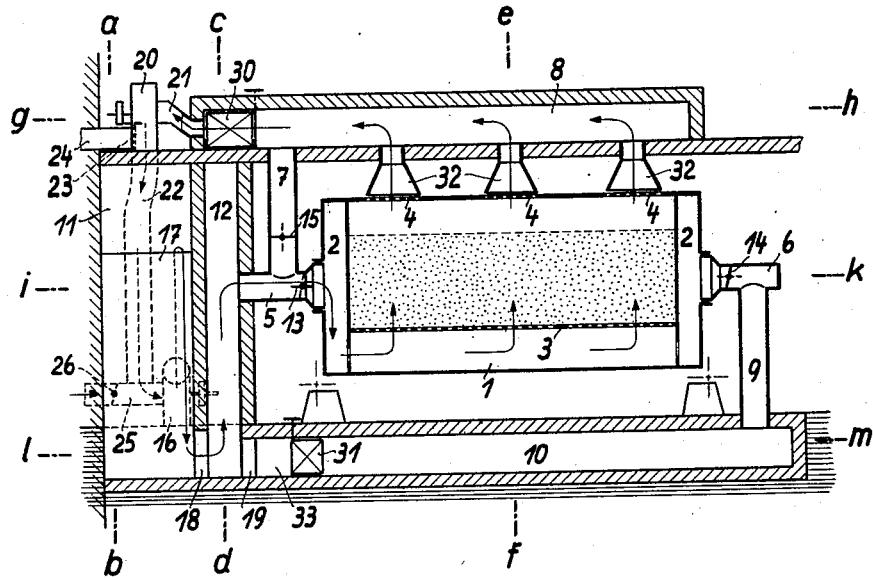

Aug. 24, 1926.                                                    1,596,977
A. KLINGLER
APPARATUS FOR AERATING SEED DRUMS
Filed March 6, 1926        2 Sheets-Sheet 1

Inventor:
Albin Klingler
By
Attorney

Aug. 24, 1926.  1,596,977
A. KLINGLER
APPARATUS FOR AERATING SEED DRUMS
Filed March 6, 1926   2 Sheets-Sheet 2
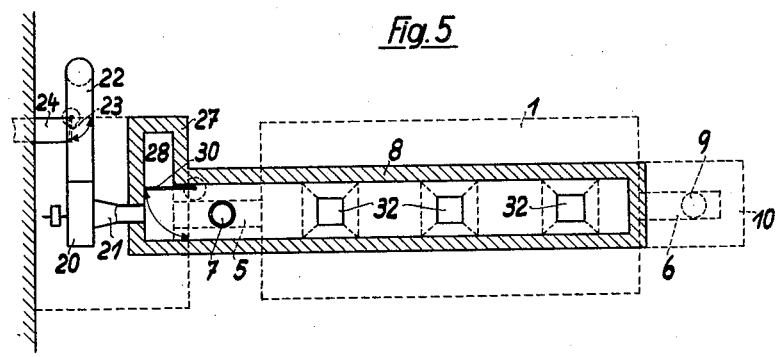
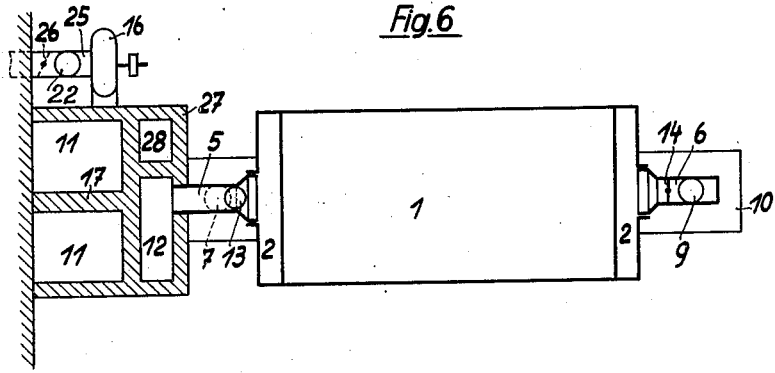
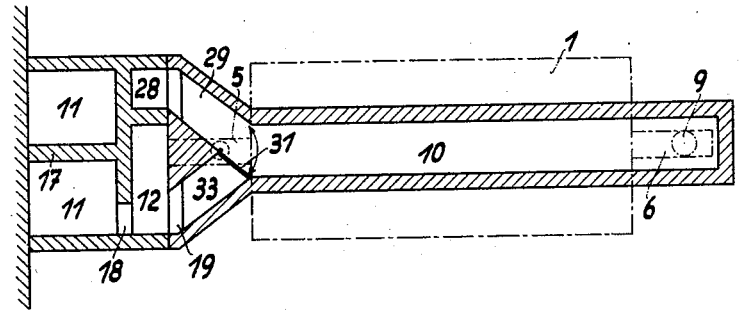
Inventor:
Albin Klingler
By
Attorney Patented Aug. 24, 1926.

1,596,977

UNITED STATES PATENT OFFICE.

ALBIN KLINGLER, OF ERFURT, GERMANY, ASSIGNOR TO J. A. TOPF & SOEHNE, OF ERFURT, GERMANY, A CORPORATION OF GERMANY.

APPARATUS FOR AERATING SEED DRUMS.

Application filed March 6, 1926, Serial No. 92,801, and in Germany March 25, 1925.

This invention relates to an apparatus for aerating seed drums and its purpose is to lead the air suited in temperature and moisture and carbon-dioxide content to the condition for the time being of the seed or the germination required, either with steady complete or partial renewal or with repeated use (as so-called return air) for the purpose of carbon-dioxide enrichment, in such a manner in alternate direction through the drum, that the seed therein is uniformly aerated with certainty in every part. It is known for this purpose to combine the drum with aerating, heating and damping devices, and to provide the air conduit with cut off and redirecting members to effect a reversal in the air direction. The invention relates chiefly to drums for particularly large charges (20,000 kg. and more per drum), which are provided with a built in sieve, which serves when the drum is at rest as a supporting surface for the seed. The seed is aerated from time to time in this position, for which purpose the air as a rule is led under the sieve. The drum then acts as a seed chest, for which reason it is also called a chest drum. The known arrangements are not sufficient for a thorough aeration in the above given sense for such drums. According to the invention for this purpose a special system of reversible and regulatable leads and canals with good utilization of space and suited to the natural current conditions and the need for large quantities of air, is provided, through which the drum at both ends as well as at the top (i. e. as a rule the part of the drum above the sieve) is connected in such a manner with the blowers and the air temperature and moisture content control devices, that aeration can be effected at will simultaneously or alternatively from both ends of the drum as well as alternately in both cross directions (through the sieve) with fresh air, or part fresh air, part return air, of desired temperature and moisture content and carbon dioxide content. An essential feature is formed by a special canal arrangement which is combined with the drum and the air temperature and moisture content controlling arrangements, and which controls the action of aeration with fewer reversing and regulating members in such a manner that the above given action of aeration is achieved while the air is in all cases compelled to pass through the air temperature and moisture content controlling arrangements which is very important for the advantageous treatment of the seed.

A further feature of the invention consists in the blowers which supply the canals being connected through a channel with control members, in order to allow the used air to be discharged or repeatedly returned wholly or in part, at will.

The drawings illustrate by way of example an embodiment of such an aerating arrangement.

Figures 2, 3, 4:
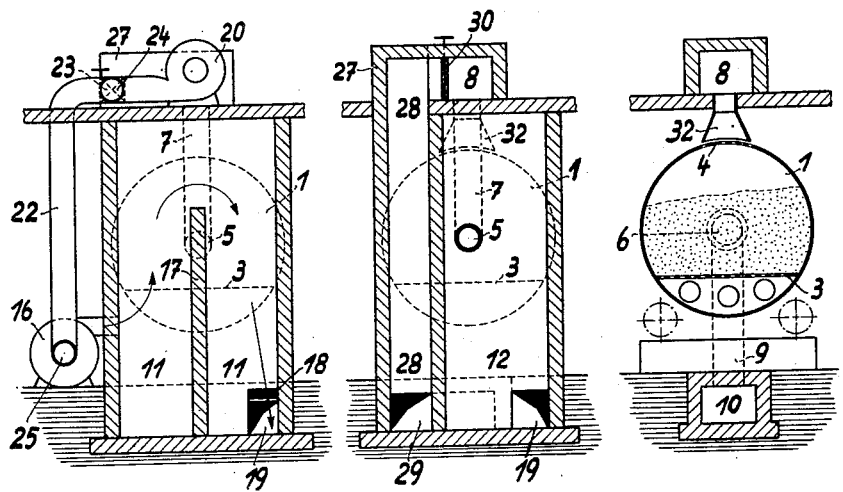

Figure 1 is a vertical longitudinal section of the whole apparatus.
Figure 2 is a section on a—b (Figure 1).
Figure 3 is a section on c—d (Figure 1).
Figure 4 is a section on e—f (Figure 1).
Figure 5 is a section on g—h (Figure 1).
Figure 6 is a section on i—k (Figure 1).
Figure 7 is a section on l—m (Figure 1).

The drum 1 is provided at both ends with empty space divisions 2 and a built in sieve 3. Its outer walls can be wholly or partly air transmitting or non-transmitting or closable, but it must be so constructed that air transmitting portions 4 (Figures 1 and 4) are provided above the sieve 3. With the ends of the drum are connected air channelled supports 5, 6, of which the front one 5 opens into an air canal 8 preferably above the drum, through a branch pipe 7, and the rear one 6 into an air canal 10 preferably below the drum, through a branch pipe 9. The front support 5 is further connected through a space 12 with a chamber 11 in which are mounted the known arrangement (not shown) for heating or cooling as well as moistening the air led in before its arrival in the drum. Further, control valves 13, 14, 15 or the like are mounted in the supports 5, 6, 7.

The supply of fresh air is provided by the blower 16, which first discharges the air sucked in through the branch 25, into the chamber 11. The latter is divided for example by an intermediate wall 17, in order to lengthen the path of the air through the temperature controlling and moisture content controlling devices. The air than passes through the opening 18 from below into the space 12 (where in certain cases it can if need be cooled or warmed or moistened again) and from thence into the drum support 5. The channel 33, 10 also connects through an opening 19 with the same chamber division. A second blower 20 the suction branch 21 of which is connected to the channel 8 serves to draw off and return the air. This blower is also connected with the suction branch 25 of the blower 16 through a channel 22, in which is provided a switch valve 23 or the like for releasing or cutting off the outlet channel 24 of the blower 20. A valve 26 is also provided in the branch 25 in front of the outlet of the channel 22.

If the channels 24, 25, are closed by the valves 23, 26, the air flowing out through the channel 8 must always return through the channel 22, blower 16. chamber 11, 12, and so forth to the drum. If both valves are open, fresh air is continually supplied. If they are partly open, aeration is effected with a mixture partly of fresh air and partly of returned air. In all cases the air or air mixture during its forward or return journey passes first through the temperature and moisture content controlling devices 11, 12.

The channel 8 is provided with air catchers 32 reaching to the drum and covering the air transmitting parts 4. In addition to connecting with the branch 21 of the blower 20, it is also connected through a branch 27 with a canal 28 (Figure 5) which is connected through a branch 29 with the canal 10 (Figure 7). Either only the canal 8 or only the canal 28 can be put in connection with the drawing off blower 20, by a control valve 30 (Figures 1 and 5). Further, both canals can be simultaneously exhausted by this blower by intermediately positioning the valve. Similar control of the canals 10 and 28 can be effected by a valve 31. The latter simultaneously controls the passage 33 from the chamber 12 to the channel 10.

This arrangement renders all methods of aeration possible, as the following shortly indicates.

*Case 1.* Aeration with fresh air from both ends of the drum at the same time. Valves 26, 13, 14 are opened, valve 31 is set to open the canal 33, 10, valve 23 to open outlet channel 24, valve 30 is set to close the canal 28. All other valves are closed. Air path: 25—16—11—12—5—33—10—9—1—32—8—21—20—24. The valve 13 is opened less than the valve 14 in order to obtain a uniform supply of air to both ends of the drum.

*Case 2.* As with Case 1, but partially or wholly with returned air. Valve 26, 23 i. e. the channels 25, 24, are partially or completely closed. Air path as Case 1 but with partial or complete return of the air from 8 through channel 22 to the blower 16, from thence returned again mixed with fresh air or alone, purely as returned air.

*Case 3.* Aeration with fresh air from the front end of the drum only. Valves 26. 13 are opened, valve 23 set to open the outlet channel 24, valve 31 to close channel 33, 10, valve 30 to close the canal 28. All other valves are closed. Air path, 25—16—11—12—51—3—32—8—21—20—24.

*Case 4.* As Case 3, but with partially or completely returned air (see the arrows marked in Figure 1). The valves 26, 23 i. e. the channels 25, 24, are partially or completely closed. Air path with return through 22 but otherwise the same as for Case 3.

*Case 5.* Aeration with fresh air from the rear end of the drum only. Valve 14 is opened, valve 31 set to open canal 33, 10, valve 23 to open the outlet 24, valve 30 to close canal 28. All the other valves are closed. Air path 25—16—11—12—19—33—10—9—6—1—3—32—8—21—20—24.

*Case 6.* As Case 5 with the return already given for Cases 2 and 4.

In all the above given cases the air passing through the seed lying on the sieve 3 passes upward from below. If the air is to pass downward from above, for aeration with fresh air then,

*Case 7.* Valves 26, 15, 14 are opened. Valve 31 is set to close passage 33, valve 30 to close the canal 8. Air path: 25—16—11—12—5—6—8—32—1—3—6—9—10—24—28—21—20—24.

In addition the return given for Cases 2, 4 and 6 is possible for this case by corresponding connection of the blower connecting passage 22.

In order to ensure the necessary saturation of the air passed through the canal 10 to the rear end of the drum, a second moistening arrangement can be provided at the canal outlet (directly in front of the transfer passage 9).

The constructional details of the whole aerating apparatus can naturally be varied in many ways from the purely diagrammatic form illustrated, while retaining the same basic inventive idea, according to local conditions, in particular those of space as well as the size of the charge and the final product desired.

What I claim is:—

1. Apparatus for aeration of seeds and the like comprising a drum having a built in sieve, air channels connected with each end of said drum, air channels opening into the top of said drum, air channels opening beneath said sieve, blowing devices, mounted adjacent to said drum, air temperature and moisture content controlling devices mounted in channels connecting said devices with said air channels and controlling means allowing aeration to be effected as desired simultaneously or alternately from both ends of the drum, as well as alternately in both cross directions, with fresh air, or part fresh air, and part returned air, or with returned air only, with the desired temperature, and moisture and carbon dioxide content.

2. Apparatus for aeration of seeds and the like comprising a drum having a built in sieve, air channels connected with each end of said drum, air channels opening into the top of said drum, air channels opening beneath said sieve, a pair of blowing devices mounted adjacent to said drum, air temperature and moisture content controlling devices mounted in channels connecting said blowing devices with said air channels, a channel connecting the discharge end of one of said blowers with the suction end of the other, and means for controlling the proportions of air passing through said connecting channel.

3. Apparatus for aeration of seeds and the like, comprising a drum having a built in sieve, air channels connected with each end of said drum, air channels opening into the top of said drum, air channels opening beneath said sieve, a pair of blowing devices mounted adjacent to said drum, air temperature and moisture content controlling devices in the discharge channel of one of said blowing devices, and means for connecting said discharge channel and the suction side of said other blowing device respectively alternately with the air channels leading to the top and bottom of said drum.

4. Apparatus for aeration of seeds and the like, comprising a drum having a built in sieve, air channels connected with each end of said drum, air channels opening into the top of said drum, an air channel opening into each end of said drum, delivering beneath said sieve, a pair of blowing devices mounted adjacent to said drum, air temperature and moisture content controlling devices in the discharge channel of one of said blowing devices, and means for connecting said discharge channel and the suction side of said other blowing device respectively alternately with the channel leading to the top and one or other end of said drum.

5. Apparatus for aeration of seeds and the like, comprising a drum having a built in sieve, main channels above and below said drum, direct connections between the upper of said main channels and the top of said drum, a regulatable connection between one end of said drum and the upper main channel, and a regulatable connection between the other end of said drum and the lower main channel, a draw-off blower mounted adjacent to said drum, a switch valve for connecting the suction side of said draw-off blower to either of said main channels at will, an air supply blower mounted adjacent to said drum, air temperature and moisture content controlling devices in the discharge channel of said air supply blower, a switch valve for connecting said discharge channel with either of said main channels at will, and a valve controlled channel for connecting said discharge channel with one end of said drum.

6. Apparatus for aeration of seeds and the like, comprising a drum having a built in sieve, main channels above and below said drum, direct connections between the upper of said main channels and the top of said drum, a regulatable connection between one end of said drum and the upper main channel, and a regulatable connection between the other end of said drum and the lower main channel, a draw-off blower mounted adjacent to said drum, a switch valve for connecting the suction side of said draw-off blower to either of said main channels at will, an air supply blower mounted adjacent to said drum, air temperature and moisture content controlling devices in the discharge channel of said air supply blower, a switch valve for connecting said discharge channel with either of said main channels at will, a valve controlled channel for connecting said discharge channel with one end of said drum, and a regulatable channel connecting the discharge side of said draw-off blower with the suction side of said air supply blower.

In testimony whereof I affix my signature.

ALBIN KLINGLER.